United States Patent
Yamaguchi et al.

(10) Patent No.: US 7,690,210 B2
(45) Date of Patent: Apr. 6, 2010

(54) AUTOMOTIVE AIR-CONDITIONING SYSTEM

(75) Inventors: Akira Yamaguchi, Chiryu (JP); Kenichi Kato, Nagoya (JP); Katsuhiko Samukawa, Okazaki (JP)

(73) Assignee: DENSO Corporation, Kariya (JP)

( * ) Notice: Subject to any disclaimer, the term of this patent is extended or adjusted under 35 U.S.C. 154(b) by 609 days.

(21) Appl. No.: 11/242,283

(22) Filed: Oct. 3, 2005

(65) Prior Publication Data

US 2006/0070388 A1 Apr. 6, 2006

(30) Foreign Application Priority Data

Oct. 4, 2004 (JP) .............................. 2004-291270

(51) Int. Cl.
*F25D 17/04* (2006.01)
*F25B 49/00* (2006.01)
(52) U.S. Cl. .......................... 62/156; 62/228.1; 62/229; 62/244; 454/75; 454/256
(58) Field of Classification Search ................ 62/186, 62/228.1, 229, 239, 244; 454/75, 156, 157, 454/158, 256, 239
See application file for complete search history.

(56) References Cited

U.S. PATENT DOCUMENTS

| 5,946,923 | A * | 9/1999 | Samukawa et al. ............. 62/133 |
| 7,080,523 | B2 * | 7/2006 | Maeda et al. ................. 62/244 |
| 2005/0235833 | A1 | 10/2005 | Sassa et al. |
| 2005/0282485 | A1 * | 12/2005 | Kato et al. ................... 454/136 |
| 2005/0282486 | A1 * | 12/2005 | Takeda et al. ................ 454/158 |

FOREIGN PATENT DOCUMENTS

| JP | 55-136612 | 10/1980 |
| JP | 62-161011 | 10/1987 |
| JP | 07-242119 | 9/1995 |
| JP | 08310230 | 11/1996 |
| JP | 09-048228 | 2/1997 |
| JP | 2000-016070 | 1/2000 |

OTHER PUBLICATIONS

Notice of Reasons for Rejection dated Mar. 19, 2009 in corresponding Japanese Patent Application No. 2004-291270.

* cited by examiner

*Primary Examiner*—Marc E Norman
(74) *Attorney, Agent, or Firm*—Harness, Dickey & Pierce, PLC

(57) ABSTRACT

In an air-conditioner control unit, when pollen mode control is set by a vehicle occupant to perform the pollen mode control that can provide a defogging effect while maintaining the pollen removal effect, the opening of an air inlet door is forcibly set to an inside-air introduction mode (S330) when the following two conditions hold: ambient temperature Tam is higher than a threshold (5 to 6° C.) set in a low-temperature region (S320), and a compressor system is able to operate normally without causing an abnormal pressure (S330). If even one of these conditions does not hold, the opening of the air inlet door is not forcibly set to the inside-air introduction mode, and the air inlet door is operated as in normal control. In this way, in the pollen mode control, since the pollen removal effect in the inside-air introduction mode is enabled only when the ambient air is relatively high, the occurrence of windshield fogging can be suppressed.

7 Claims, 7 Drawing Sheets

(a)

(b)

(c)

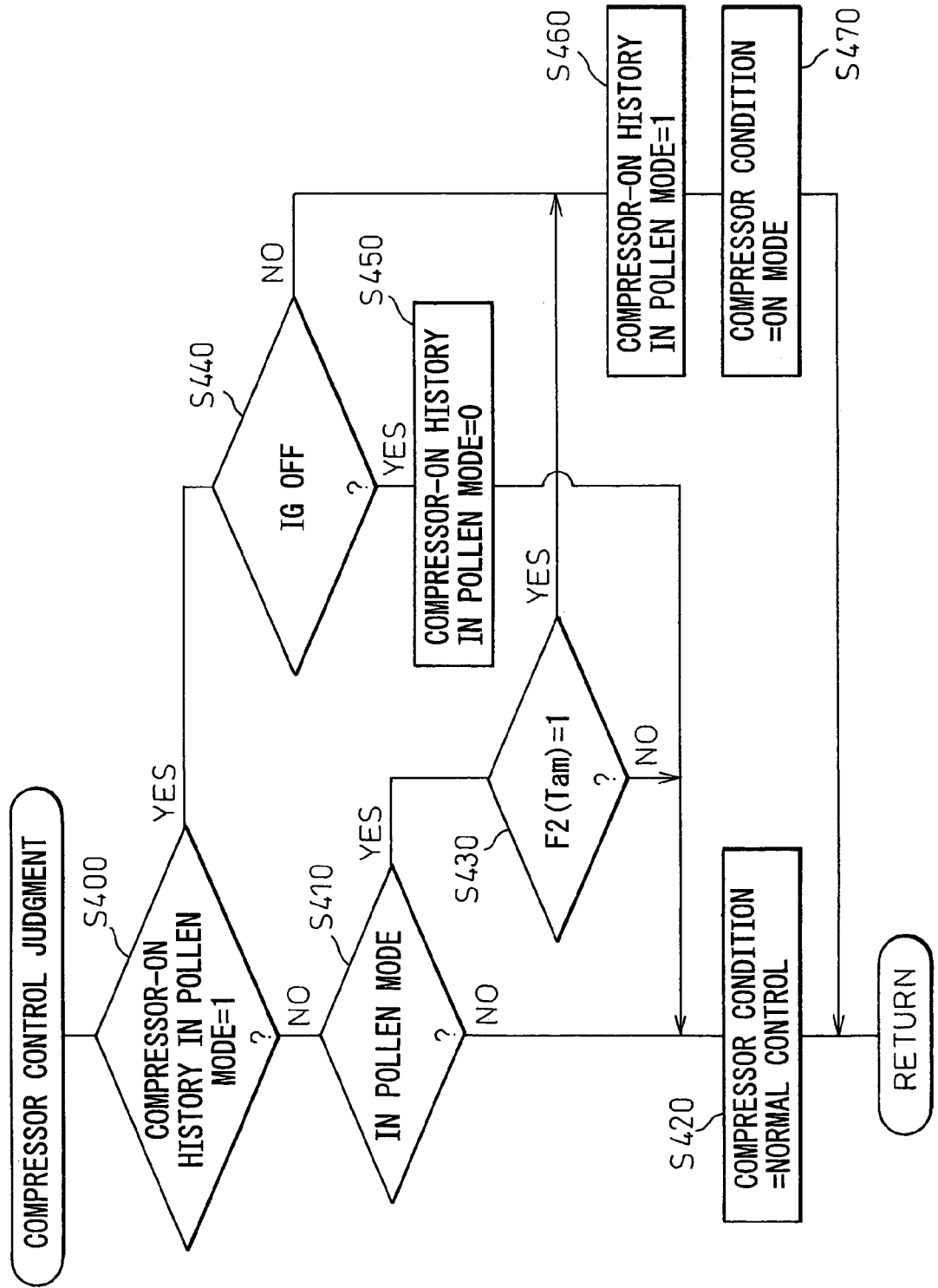

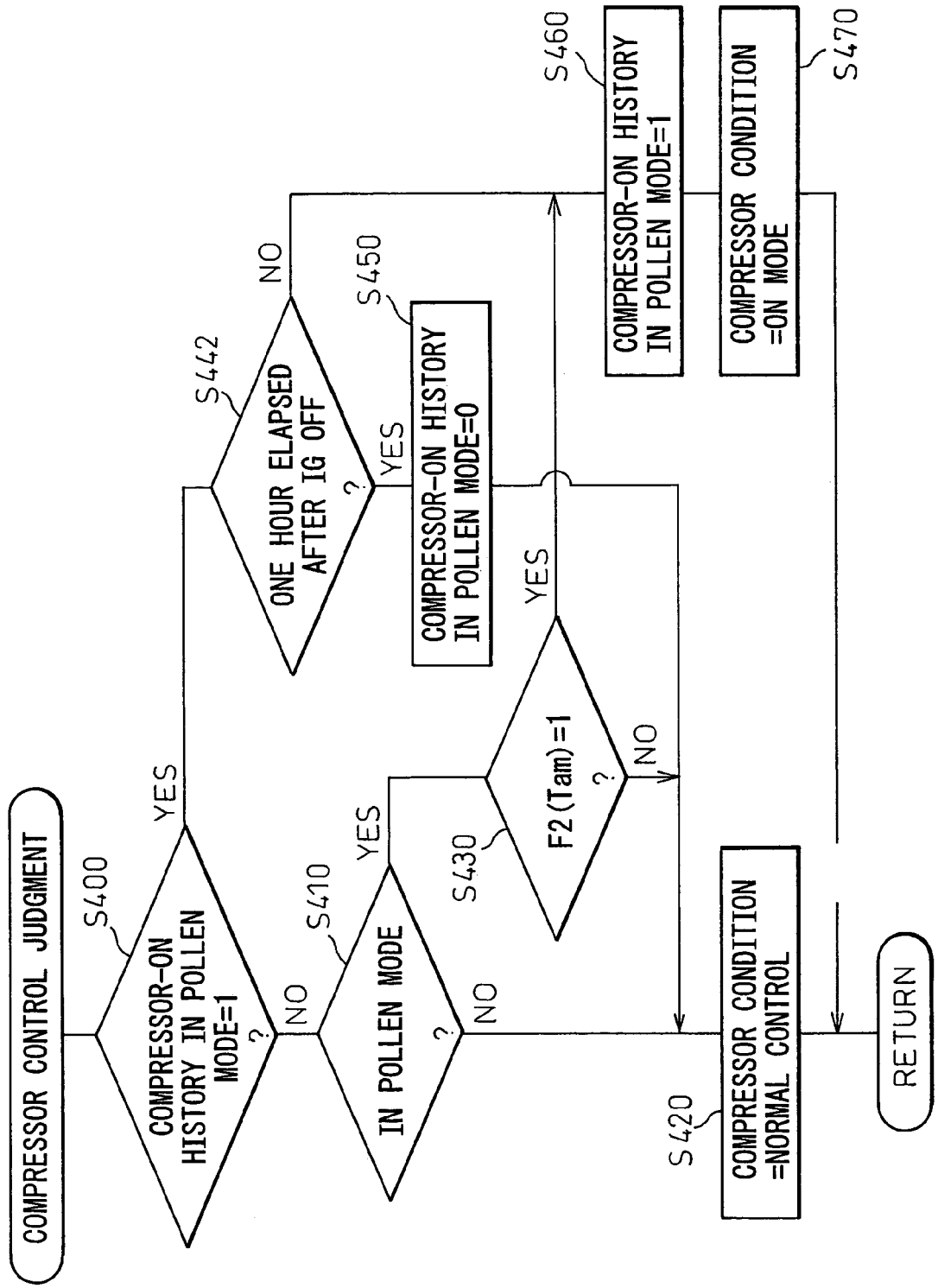

AUTOMOTIVE AIR-CONDITIONING SYSTEM

CROSS-REFERENCE TO RELATED APPLICATION

This application claims priority from Japanese Patent Application No. 2004-291270, filed on Oct. 4, 2004.

BACKGROUND OF THE INVENTION

1. Field of the Invention

The present invention relates to an automatic air-conditioning system which performs automatic control to provide a comfortable air-conditioned environment within the passenger compartment of a vehicle and, more particularly, to an automotive air-conditioning system that can enhance the occupant comfort by reducing the effects of pollen on the occupants.

2. Prior Art

In recent years, the demand for air-conditioned comfort has grown and, along with this, the need to protect occupant health, especially, the need to remove pollen, has increased. As a system to meet such a need, an automotive air-conditioning system is proposed that has a pollen removal filter which is installed only in an outside-air inlet duct so that outside air free from pollen is supplied into the passenger compartment (for example, refer to Japanese Unexamined Patent Publication No. H08-310230).

With the above prior art, however, it is not possible to remove pollen drawn in through a vehicle door when a passenger opens the door to get into the vehicle, nor is it possible to remove pollen adhering to the face, hair, or clothes of an occupant who has entered the vehicle. In view of this, the present applicant has proposed an invention for preventing such drawn-in pollen or occupant-borne pollen from floating near the face of the occupant, by effecting a pollen mode control for reducing the effects of the pollen on the occupant (Japanese Patent Application No. 2004-125447).

The pollen mode control is effected by setting the inside/outside air inlet to an inside-air introduction mode, the air outlet to a face mode, and the blower level to a medium level, and in this condition, pollen is collected by the filter installed in the air-conditioning unit and the air purified by removing the pollen is blown toward the face of the occupant in the passenger compartment.

However, as the above prior art pollen mode control is effected by setting the air inlet to the inside-air introduction mode to prevent pollen from entering from outside the vehicle, there is the possibility that, in the inside-air introduction mode, windshield fogging may occur if the outside temperature is relatively low.

SUMMARY OF THE INVENTION

In view of the above problem, it is an object of the present invention to achieve a pollen mode control that can provide a defogging effect while maintaining the pollen removal effect.

To achieve the above object, an automotive air-conditioning system according to a first mode of the present invention comprises: an inside/outside air selecting means (11a), provided at an upstream end of an air-conditioning unit (10), for selecting between inside air and outside air for introduction therein; a blower (12), provided downstream of the inside/outside air selecting means, for blowing air into a vehicle passenger compartment; an evaporator (13), provided downstream of the blower, for cooling the air supplied from the blower by a refrigerant which is pressurized and pumped by a compressor (25); pollen mode setting means (39f, 36) for setting pollen mode control; an ambient temperature sensor (32) for detecting temperature outside the passenger compartment; and an air-conditioner control unit (30) having a control switching means for switching the operation of at least either the inside/outside air selecting means or the compressor from normal control to forced control in accordance with the ambient temperature detected by the ambient temperature sensor when the pollen mode control is set.

According to this mode, when the pollen mode control is set, the control of the selection operation of the inside/outside air selecting means and the control of the driving/stopping of the compressor can be performed based on the ambient temperature. That is, when the ambient temperature is low, windshield fogging is likely to occur in the inside-air introduction mode effected by the inside/outside air selecting means, or even in the outside-air introduction mode if the air outlet mode in which the defroster air outlet is closed is selected when the compressor is not operating. Accordingly, in the pollen mode control, the occurrence of windshield fogging can be prevented by controlling the selection between the inside and outside air and the ON/OFF operation of the compressor in accordance with the ambient temperature.

In a system according to a second mode of the present invention, when the pollen mode control is set, the control switching means in the air-conditioner control unit sets the inside/outside air selecting means to an inside-air introduction mode when the ambient temperature is higher than a first threshold in a low-temperature region, and clears the setting of the inside-air introduction mode when the ambient temperature drops below the first threshold.

According to this mode, when the ambient temperature is higher than the first threshold in the low-temperature region, the air inlet mode is set to the inside-air introduction mode to maintain the pollen removal effect while, on the other hand, when the ambient temperature is in a temperature region lower than the first threshold where windshield fogging is likely to occur, the occurrence of windshield fogging can be prevented by clearing the setting of the inside-air introduction mode.

Further, in a system according to a third mode of the present invention, the compressor includes a compressor condition judging means (37) for judging whether the compressor is able to operate normally or not, wherein when the ambient temperature is higher than the first threshold and, when a negative response is returned as a result of the judgment by the compressor condition judging means, the control switching means in the air-conditioner control unit clears the setting of the inside-air introduction mode in the pollen mode control.

According to this mode, even when the ambient temperature is higher than the first threshold, if it is judged that the compressor is unable to operate normally, the setting of the inside-air introduction mode is cleared; this serves to prevent damage from being caused to the compressor system.

In a system according to a fourth mode of the present invention, when the pollen mode control is set, the control switching means in the air-conditioner control unit operates the compressor to cool the evaporator. In this way, even when the air outlet mode selected to provide the pollen removal effect in the pollen mode control is a mode that can cause windshield fogging, as the compressor is operated in accordance with the ambient temperature, the inlet air is dehumidified by the evaporator to prevent windshield fogging.

Further, in a system according to a fifth mode of the present invention, when the pollen mode control is set, the control switching means in the air-conditioner control unit operates the compressor to cool the evaporator when the ambient temperature is lower than a second threshold. Accordingly, when the ambient temperature is in a temperature region higher than the second threshold, where windshield fogging is less likely to occur, energy consumption can be reduced by stopping the compressor.

In a system according to a sixth mode of the present invention, the control switching means in the air-conditioner control unit continues to operate the compressor after the setting of the pollen mode control is cleared by the pollen mode setting means.

According to this mode, by continuing the operation of the compressor even when the setting of the pollen mode control is cleared, moisture condensed on the evaporator during the operation of the compressor can be prevented from scattering off due to the temperature rise of the evaporator, and the occurrence of windshield fogging can thus be prevented.

In a system according to a seventh mode of the present invention, the control switching means in the air-conditioner control unit stops the operation of the compressor when an ignition switch (38) is turned off. That is, by continuing the operation of the compressor until the ignition switch is turned off, condensed moisture on the evaporator can be reliably prevented from scattering off the evaporator, to prevent the occurrence of windshield fogging.

Further, in a system according to an eighth mode of the present invention, the control switching means in the air-conditioner control unit stops the operation of the compressor in accordance with a length of time that has elapsed after the ignition switch (38) has been turned off. In this way, after the engine has been stopped by turning off the ignition switch, when the ignition switch is turned on again within a predetermined elapsed time to operate the air-conditioning system, the compressor can be immediately put into operation unconditionally; accordingly, any condensed moisture remaining adhering to the evaporator after turning off the ignition switch can be prevented from scattering off when the ignition switch is turned on again, and the occurrence of windshield fogging can thus be prevented.

In a system according to a ninth mode of the present invention, the pollen mode setting means comprises a pollen mode switch or a pollen sensor, and when the pollen mode switch is operated or when the amount of pollen detected by the pollen sensor exceeds a predetermined value, it is determined that the pollen mode control is to be set. This facilitates the setting of the pollen mode.

Numerals in parentheses suffixed to the names of the above-described means correspond to the reference numerals of the specific means stated in the description of the embodiments hereinafter given.

The present invention may be more fully understood from the description of preferred embodiments of the invention, as set forth below, together with the accompanying drawings.

BRIEF DESCRIPTION OF THE DRAWINGS

FIG. 8 is a flowchart showing a processing routine for the judgment of compressor control according to a second embodiment.

FIG. 9 is a flowchart showing a processing routine for the judgment of compressor control according to a third embodiment.

DETAILED DESCRIPTION OF THE PREFERRED EMBODIMENTS

Embodiment 1

Figure 1:
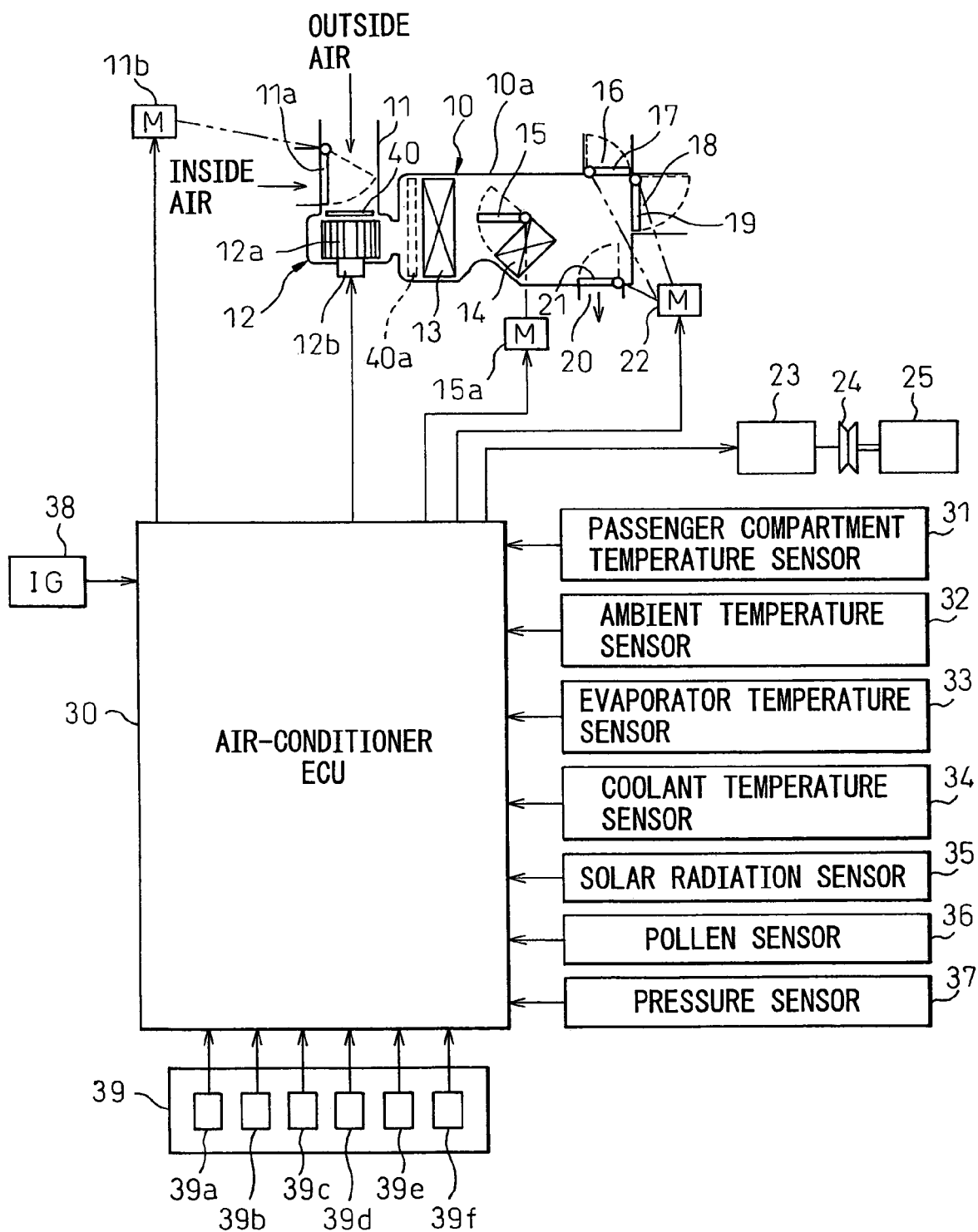
FIG. 1 is a general system diagram of an automotive air-conditioning system according to a first embodiment of the present invention.

A first embodiment of the present invention will be described below with reference to the drawings. FIG. 1 is a general system diagram of the first embodiment. In the automotive air-conditioning system of the first embodiment, an air-conditioning unit 10 mounted in the passenger compartment will be described first.

An inside/outside air selection box 11 is mounted at the airflow upstream end of the air-conditioning unit 10, and a plate-like inside/outside air selection door 11a is pivotally mounted inside the switching box 11. The inside/outside air selection door 11a is operated by an actuator 11b, a servo motor, to select between inside air (air inside the passenger compartment) and outside air (air outside the passenger compartment) for introduction into the air-conditioning unit 10.

A blower 12 is installed on the downstream side of the inside/outside air selection box 11. The blower 12 comprises a centrifugal blower fan 12a and a driving motor 12b, and blows the air, introduced via the inside/outside air selection box 11, into the passenger compartment through an air passage 10a formed inside the housing of the air-conditioning unit 10.

A filter 40 is installed directly adjacent to the upstream side of the blower 12. The outside air or inside air introduced via the inside/outside air selection box 11 is passed through the filter 40 which removes pollen and dust from the outside air or inside air.

The filter 40 contains a pollen allergen inactivating substance (for example, phenol-based high-molecular polymer). which inactivates the allergens that cause hay fever. The pollen allergen inactivating substance combines with the active sites in the pollen allergens and inactivates the allergens. Therefore, if the pollen once collected by the filter should be separated from the filter and drawn into the passenger compartment, the pollen would not set off a hay fever attack in the vehicle occupant because the pollen is already inactivated by the pollen allergen inactivating substance. In this way, the air passed through the filter 40 is introduced as purified air into the passenger compartment.

The filter 40 may be installed anywhere in the air passage 10a as long as it can filter all the air passing through the air passage 10a; for example, it may be installed directly adjacent to the downstream side of the blower 12 as indicated by a dashed line 40a in FIG. 1.

Inside the air passage 10a of the air-conditioning unit 10, an evaporator 13 is mounted directly adjacent to the downstream side of the blower 12, and a heater core 14 is disposed on the downstream side of the evaporator 13.

The evaporator 13 constitutes a cooling heat exchanger, which is provided within a known refrigeration cycle having a compressor 25 driven by a vehicle engine (not shown), and cools the air flowing over it as the low-pressure refrigerant flowing through the evaporator 13 absorbs heat from the air and vaporizes. The compressor 25 is equipped with a power engaging/disengaging electromagnetic clutch 24 driven by a driving unit 23, and the power of the vehicle engine is transmitted to the compressor 25 via the electromagnetic clutch 24.

The heater core 14 constitutes a heating heat exchanger, and heats the air flowing through it by taking heat from the hot water (coolant) circulating from the vehicle engine not shown.

An air mix door 15 constituting an outlet air temperature regulating means is pivotably mounted on the upstream side of the heater core 14. The opening of the air mix door 15 is adjusted by being driven by an actuator 15a, to adjust the proportion of the air passing through the heater core 14 to the air bypassing the heater core 14, thus regulating the temperature of the conditioned air to be blown into the passenger compartment.

At the downstream end of the air-conditioning unit 10 are installed a defroster door 17 for opening and closing a defroster air outlet 16 through which to blow the conditioned air toward the windshield W, a face door 19 for opening and closing a face air outlet 18 through which to blow the conditioned air toward the face and the upper part of the body of the occupant, and a foot door 21 for opening and closing a foot air outlet 20 through which to blow the conditioned air toward the feet of the occupant.

These doors 17, 19, and 21 constitute an air outlet control means, and are opened and closed in interlinking fashion by a common actuator 22 via a linking mechanism not shown. By controlling the opening/closing of these doors 17, 19, and 21, known outlet mode selections are accomplished.

Next, a description will be given of an electric control section according to the present embodiment. An air-conditioner control unit (air-conditioner ECU) 30 is a control means comprising a microcomputer and its peripheral circuitry, and starts operating upon the turning on of an ignition switch 38 for starting the vehicle engine. The air-conditioner control unit 30 controls the operation of the various actuators 11b, 15a, and 22, the blower driving motor 12b, and the driving unit 23 for driving the compressor 25, by performing operations based on a prescribed control program implemented on the microcomputer.

Signals from various sensors provided to detect environmental conditions that affect the air conditioning of the passenger compartment are input to the air-conditioner control unit 30. More specifically, signals are input to the air-conditioner control unit 30 from a passenger compartment temperature sensor 31 for detecting the temperature of the air (inside air temperature) Tr inside the passenger compartment, an outside air temperature sensor 32 for detecting the temperature of the air (ambient air) Tam outside the passenger compartment, an evaporator temperature sensor 33 for detecting the outlet air temperature Te of the evaporator 13, a coolant temperature sensor 34 for detecting the coolant temperature Tw in the heater core 14, a solar radiation sensor 35 for detecting the amount of solar radiation Ts entering the passenger compartment, a pollen sensor 36 for detecting the amount of pollen (or pollen concentration) in the passenger compartment, and a pressure sensor 37 as a compressor condition judging means for detecting the discharge pressure of the compressor 25.

Here, the pollen sensor 36 is a small optical sensor of a known type; that is, the atmosphere containing pollen is actively introduced into a measuring chamber which is irradiated with laser light, and the amount of pollen inside the measuring chamber is measured by detecting the scattering of light from spherical pollen particles in two directions.

An air-conditioner operation panel 39 is mounted near the instrument panel (not shown) in the passenger compartment, and comprises a plurality of operation members 39a to 39f manually operated by the occupant. Operation signals from these operation members 39a to 39f are input to the air-conditioner control unit 30. More specifically, the plurality of operation members include an AUTO switch 39a for effecting the automatic control mode of the air-conditioner, a temperature setting switch 39b for setting the temperature of the passenger compartment to the temperature that the occupant desires, an inside/outside air selector switch 39c for setting the outside-air introduction mode or inside-air recirculation mode, an air outlet mode selector switch 39d for setting the air outlet mode (face, bi-level, foot, foot DEF, and defroster), a blower level selector switch 39e for setting the blower level of the blower 12, and a pollen mode switch 39f for switching between normal control and pollen mode control described hereinafter.

Here, the pollen mode switch 39f may be implemented as a special pushbutton switch provided on the instrument panel or the like, or as a touch switch (not shown) included in an air-conditioner panel 39 that is displayed on a touch panel type navigation screen by switching from a navigation map, etc.

Figure 2:
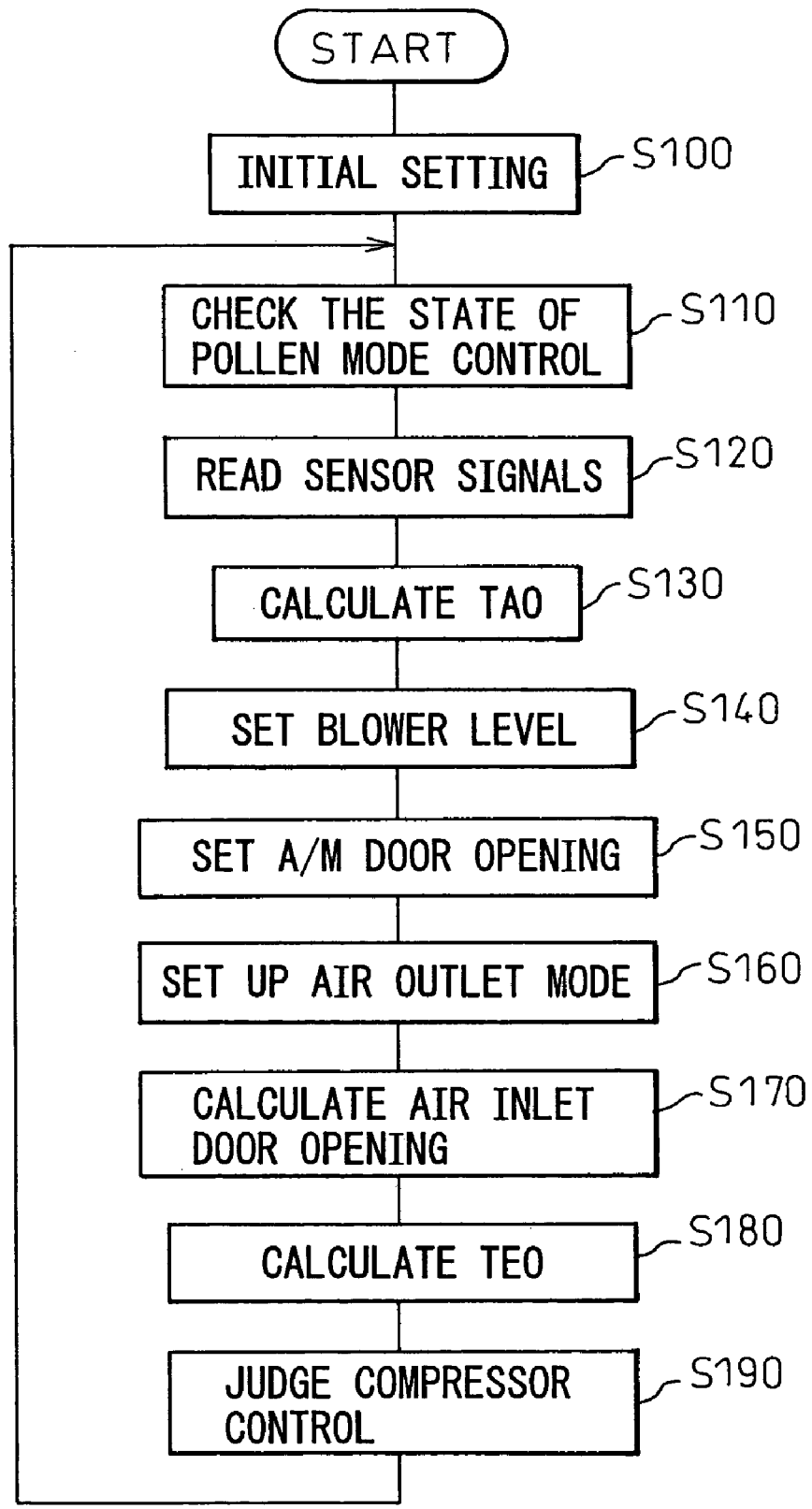
FIG. 2 is a flowchart showing a main routine executed by an air-conditioner control unit.

Next, the operation of the present embodiment having the above configuration will be described. FIG. 2 is a flowchart showing the main routine executed by the air-conditioner control unit 30. This control routine is started upon the turning on of the ignition switch 38, and is thereafter repeated at predetermined intervals of time.

First, in step S100, flags, timers, etc. are initialized, and in the next step S110, it is determined whether the occupant has operated the pollen mode switch 39f to effect the pollen mode control. More specifically, when the pollen mode switch 39f is operated, or when the amount of pollen detected by the pollen sensor 36 exceeds a predetermined value, for example, it is determined that the pollen mode control is effected, and the flag is set (flag=1).

In the next step S120, operation signals are read from the operation switches 39a to 39f on the air-conditioner operation panel 39, and vehicle environment detection signals are read from the various sensors 31 to 36.

Next, in step S130, the target outlet air temperature TAO is calculated which is used in the normal air-conditioner control mode (called the auto mode or normal control) and the pollen mode control. The target outlet air temperature TAO defines the outlet air temperature necessary to maintain the passenger compartment at the set temperature Tset set by the temperature setting switch 39b, and provides the basic target value for air-conditioner control. The target outlet air temperature TAO is calculated from the following known equation (1) based on the set temperature Tset set by the temperature setting switch 39b on the air-conditioner operation panel 39, and on the passenger compartment temperature Tr, the ambient temperature Tam, and the amount of solar radiation Ts detected by the respective sensors as relating to the air-conditioning thermal loads.

$$TAO = K_{set} \times T_{set} - K_r \times T_r - K_{am} \times T_{am} - K_s \times T_s + C. \quad (1)$$

where Kset, Kr, Kam, and Ks are control gains, and C is a correction constant.

Figure 3:
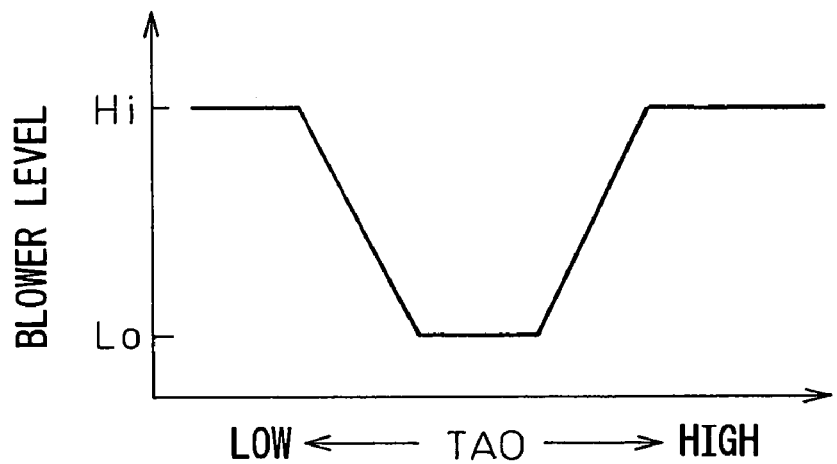
FIG. 3(a) is a diagram showing a blower level control characteristic during normal control.
FIG. 3(b) is a diagram showing an air outlet mode control characteristic during the normal control.
FIG. 3(c) is a diagram showing an air inlet mode control characteristic during the normal control.
Figure 3:
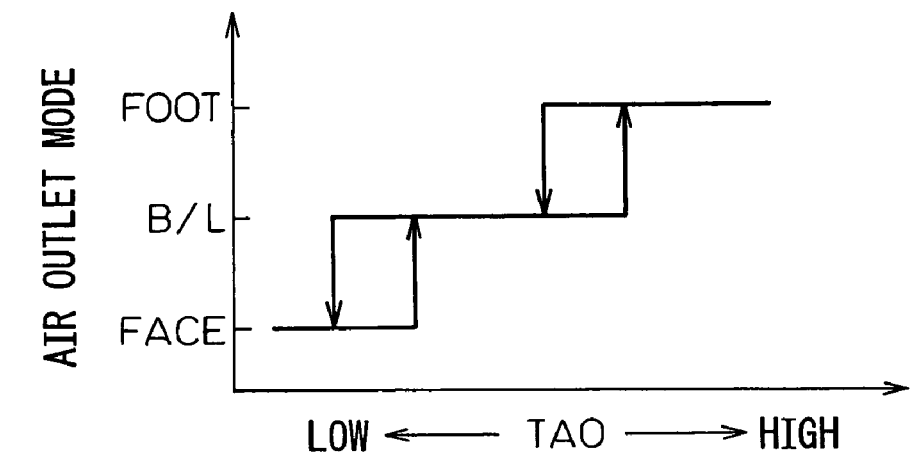
Figure 3:
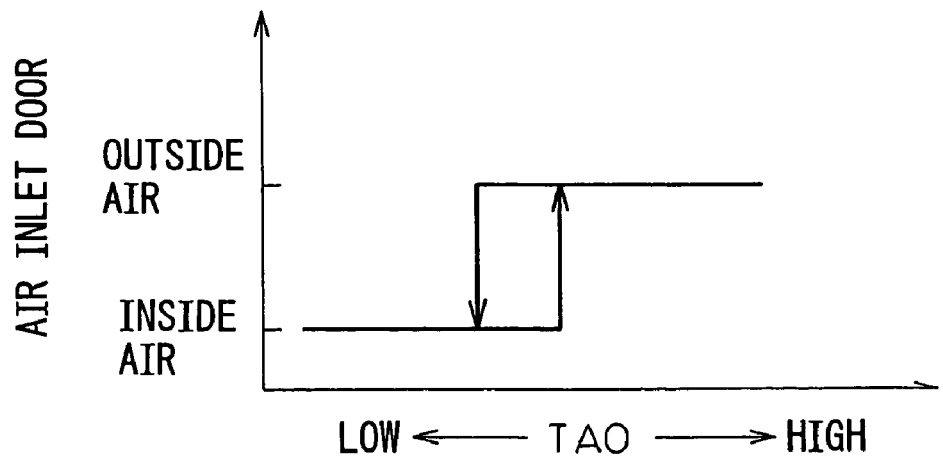

Next, in step S140, the blower level of the blower 12 is set based on the target outlet air temperature TAO. More specifically, as shown in FIG. 3(a), the blower level is set to maximum (Hi) in the low-temperature and high-temperature sides of the target outlet air temperature TAO, and to minimum (Lo) in the intermediate-temperature region of TAO. Here, the blower level is determined in terms of the voltage level applied to the driving motor 12b of the blower 12, and the blower level of the blower 12 is varied by varying the voltage level.

Next, in step S150, the target opening SW of the air mix door (A/M door) 15 is calculated. Basically, the target opening SW of the A/M door is calculated from the following equation (2) by using the outlet air temperature Te of the evaporator 13 (the temperature detected by the evaporator temperature sensor 33), the coolant temperature Tw in the heater core 14 (the temperature detected by the coolant temperature sensor 34), and the target outlet air temperature TAO.

$$SW = \{(TAO - Te)/(Tw - Te)\} \times 100 (\%) \quad (2)$$

Here, when SW=0%, the air mix door 15 is at the maximum cooling position, and when SW=100%, the air mix door 15 is at the maximum heating position.

Next, in step S160, the air outlet mode (air outlet damper position) is set up. More specifically, when in the normal control, the setting is made based on the target outlet air temperature TAO in accordance with the characteristic shown in FIG. 3(b). That is, as the target outlet air temperature TAO varies from the low-temperature side toward the high-temperature side, the air outlet mode is switched from the face mode to the bi-level (B/L) mode, and then to the foot mode, in this order.

On the other hand, if the pollen mode control is selected in step 110, the face mode is always selected irrespective of the target outlet air temperature TAO, and the face door 19 is opened to blow the conditioned air through the face air outlet 18 toward the upper part of the occupant's body, thereby blowing pollen off the upper part of the occupant's body (especially, the occupant' face) and thus accomplishing pollen removal. In the face mode in the pollen mode control, the defroster air outlet 16 and the foot air outlet 20 are both closed.

In the next step S170, the air inlet mode is set up, that is, the opening of the air inlet door 11a in the inside/outside air selection box 11 is calculated. More specifically, the calculation is performed in accordance with the processing routine shown in the flowchart of FIG. 4.

Figure 4:
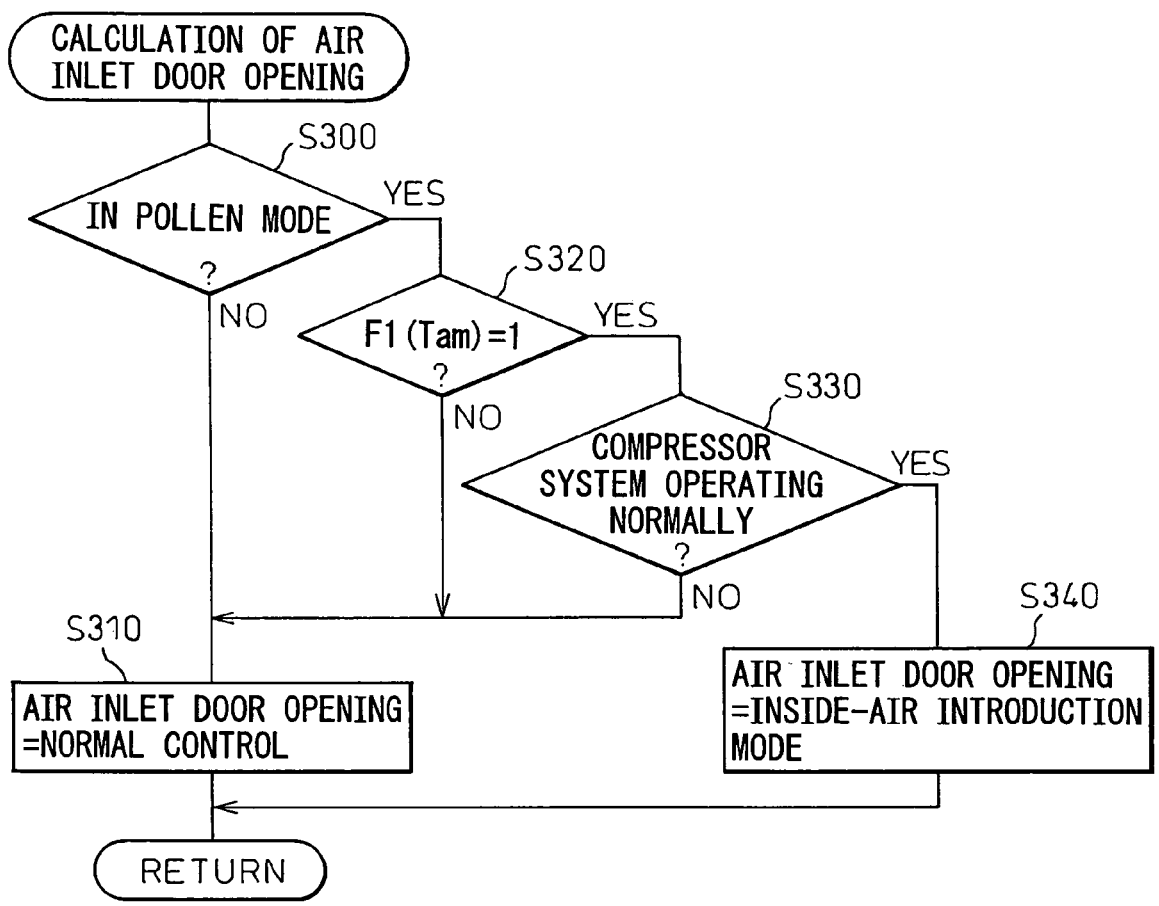
FIG. 4 is a flowchart showing a processing routine for the calculation of air inlet door opening according to the first embodiment.

In FIG. 4, in step S300, it is determined whether the air-conditioner is in the pollen mode control by examining the flag state. If the pollen mode control is not set, the process proceeds to step S310 where the opening of the air inlet door 11a in the normal control is set based on the target outlet air temperature TAO as shown in FIG. 3(c). As is well known, the air inlet mode in the normal control is set up so as to switch the opening of the air inlet door 11a from the inside-air mode side when the target outlet air temperature TAO is low to the outside-air mode side when TAO is high.

Figure 5:
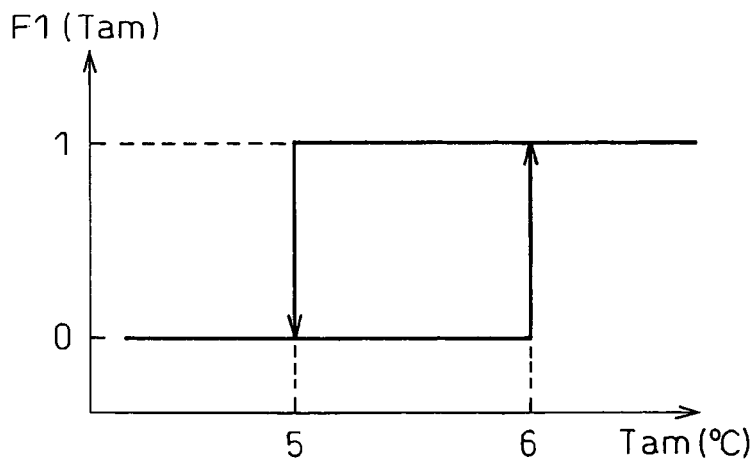
FIG. 5 is a diagram showing the characteristic of an air inlet state transition value F1(Tam).

On the other hand, when it is determined in step S300 that the air-conditioner is in the pollen mode control, the process proceeds to step S320 where an air inlet state transition value F1(Tam) that matches the ambient temperature Tam is calculated as shown in FIG. 5. That is, the air inlet state transition value F1(Tam) is set to "1" when the ambient temperature Tam is higher than a first threshold (5 or 6° C.) and to "0" when it is lower than the first threshold. The first threshold is set to a relatively low temperature.

Then, when the air inlet state transition value F1(Tam) is 0, the process proceeds to step S310 where the air inlet door opening is set to a value (outside-air mode or inside-air mode) that matches the target outlet air temperature TAO used in the normal control.

On the other hand, when the air inlet state transition value F1(Tam) is 1, the process proceeds to step S330 where the compressor condition judging means judges whether the compressor system is operating normally or not. More specifically, whether the compressor system is operating normally or not can be checked by checking whether or not the refrigerant pressure in the refrigeration cycle (not shown) detected by the pressure sensor 37 shows an abnormal value (abnormally high pressure or abnormally low pressure).

If it is determined that the compressor system is not operating normally, the process proceeds to step S310, and the air inlet door opening is set equal to that used in the normal control. On the other hand, if it is determined that the compressor system is operating normally, the process proceeds to step S340 where the air inlet door opening is forcibly set to the inside-air mode (inside-air introduction mode) irrespective of the target outlet air temperature TAO.

In this way, in step S170, the air inlet door opening in the pollen mode control is forcibly set to the inside-air introduction mode only when the ambient temperature Tam is higher than the first threshold (5 or 6° C.) and when the compressor system is operating normally; as a result, the windshield defogging effect can be reliably obtained.

If the ambient temperature Tam is lower than the first threshold, the air inlet mode is not forcibly set to the inside-air introduction mode even when the air-conditioner is in the pollen mode control but, in the low ambient temperature condition, the target outlet air temperature TAO becomes high, and the air inlet door 11a is highly likely to be set to the outside-air introduction mode, making windshield fogging difficult to occur.

In the next step S180, the target evaporator outlet air temperature TEO is calculated. That is, as is well known, a first evaporator outlet air temperature TAO1 is calculated in such a manner as to increase with increasing target outlet air temperature TAO, and a second evaporator outlet air temperature TAO2 is calculated in such a manner as to become high in the middle temperature region (for example, 18 to 25° C.) of the ambient temperature and to become low in the low- and high-temperature regions. The first evaporator outlet air temperature TAO1 or the second evaporator outlet air temperature TAO2, whichever is lower, is set as the target evaporator outlet air temperature TEO.

Figure 6:
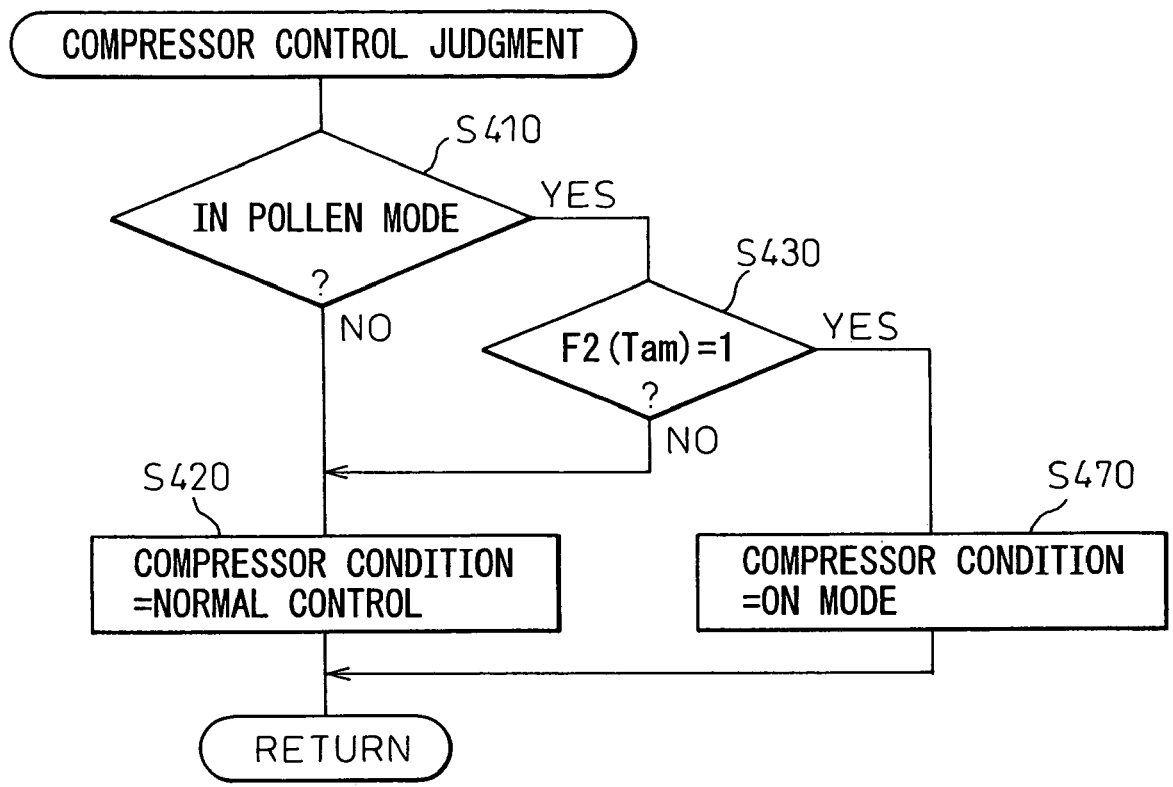
FIG. 6 is a flowchart showing a processing routine for the judgment of compressor control according to the first embodiment.

Then, in the next step S190, compressor control is judged. A specific processing routine for the compressor control judgment is shown in FIG. 6. In FIG. 6, first in step S410, it is determined whether the pollen mode control is set or not.

If the pollen mode control is not set, the process proceeds to step S420, and the compressor 25 is operated in the operating condition set in the normal control. More specifically, as is well known, an ON-OFF signal is supplied to the driving circuit 23 so as to engage or disengage the electromagnetic clutch 24 based on whether the outlet air temperature Te of the evaporator 13 is lower than or higher than the target evaporator outlet air temperature TEO calculated in step S180.

Figure 7:
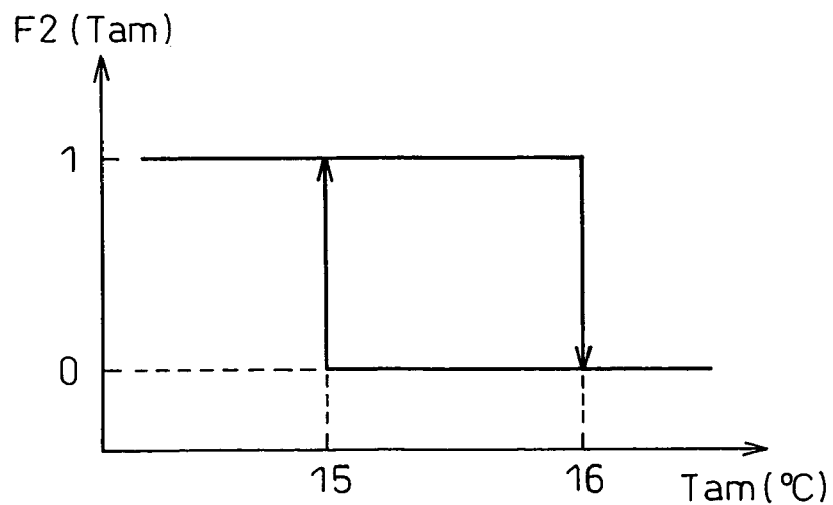
FIG. 7 is a diagram showing the characteristic of a compressor state transition value F2(Tam).

On the other hand, if the pollen mode control is set, the process proceeds to step S430 where a compressor state transition value F2(Tam) that matches the ambient temperature Tam is calculated as shown in FIG. 7. That is, the compressor state transition value F2(Tam) is set to "1" when the ambient temperature Tam is lower than a second threshold (15 or 16° C.) and to "0" when it is higher than the second threshold. The second threshold is set to a medium temperature higher than the first threshold.

When the compressor state transition value F2(Tam) is 0, the process proceeds to step 420 where the compressor 25 is controlled ON and OFF in accordance with TEO in the normal control. On the other hand, when the compressor state transition value F2(Tam) is 1, the process proceeds to step S470 where the compressor 25 is forcibly put into operation (ON) irrespective of the target evaporator outlet air temperature TEO.

In this way, in step S190, when the ambient temperature Tam is lower than the second threshold (15 or 16° C.), the compressor 25 in the pollen mode control is forcibly put into operation (ON) so that air is dehumidified by the evaporator 13 and the dehumidified air is blown into the passenger compartment to prevent windshield fogging. On the other hand, when the ambient temperature Tam is higher than the second threshold, the compressor 25 is not forcibly turned ON, and the operation is controlled based on the target evaporator outlet air temperature TEO in the normal control mode.

As described above, according to the first embodiment, in step S170 (S300 to S340), when the pollen mode control is set, and when the compressor is able to operate normally, then if the ambient temperature Tam is higher than the first threshold, the air inlet mode is forcibly set to the inside-air introduction mode. Likewise, in step S190 (S410 to S470), when the pollen mode control is set, if the ambient temperature Tam is lower than the second threshold which is higher than the first threshold, the compressor 25 is forcibly put into operation.

Accordingly, in the pollen mode control, when the inside-air introduction mode is set to obtain the pollen removal effect, if the ambient temperature is lower than the second threshold, the compressor 25 can be forcibly put into operation, thereby causing dehumidified air to be blown into the passenger compartment to prevent windshield fogging.

Further, if, at this time, it is determined that the compressor is unable to operate normally, the air inlet mode does not forcibly switch to the inside-air introduction mode even when the pollen mode control is set; as a result, windshield fogging seldom occurs. This is particularly effective in suppressing windshield fogging when the air outlet mode is set to the face mode by the pollen mode control in order to remove pollen from the upper part of the occupant's body. That is, in the face mode, as the defroster air outlet 16 and the foot air outlet 20 are both closed, the windshield becomes susceptible to fogging if the air inlet mode is set to the inside-air introduction mode.

In the low ambient temperature range where the ambient temperature Tam is lower than the first threshold, as the air inlet mode is not forcibly set to the inside-air introduction mode in the pollen mode control, windshield fogging can be suppressed. On the other hand, in the medium- and high-temperature ranges where the ambient temperature Tam is higher than the second threshold, windshield fogging does not easily occur even in the inside-air introduction mode; therefore, by not effecting the forced operation of the compressor 25, energy consumption can be reduced while suppressing the occurrence of windshield fogging.

Embodiment 2

Next, a second embodiment of the present invention will be described. The second embodiment is the same as the first embodiment in that, in the pollen control mode, the compressor 25 is forcibly put into operation when the ambient temperature Tam is lower than the second threshold, but differs from the first embodiment in that, once the pollen mode is set, the forced operating condition of the compressor 25 is not cleared even when the pollen mode control is cleared by the pollen mode setting means. In the following, the description of the same constituent parts as those in the first embodiment will not be repeated, but only differences will be described.

FIG. 8 is a flowchart showing a processing routine for judging the compressor control according to the second embodiment. As in the first embodiment, the blower level setting is executed in step S140 in the main routine of FIG. 2. In FIG. 8, the same processing steps as those in the first embodiment (FIG. 6) are designated by the same step numbers, and a description thereof will not be repeated here.

First, in step S400, it is determined whether the compressor 25 has ever been forcibly put into operation (ON state) in the pollen mode control by checking whether its history flag is 1 or 0. If the pollen mode has not been set since the ignition switch 38 was turned on, the history flag is 0, so that the process proceeds to step S410. The processing in steps S410, S420, S430, and S470 is the same as that in the corresponding steps in the first embodiment, and therefore, will not be described here.

If the history flag is 1 in step S400, the process proceeds to step S440 regardless of whether the pollen mode control is set or not, and it is determined whether the ignition switch (IG) is OFF or not. If the IG 38 is OFF, that is, if the engine is stopped, then in step S450 the history flag indicating whether the compressor 25 has ever been forcibly put into operation in the pollen mode control is reset to 0, and the process proceeds to step S420 where the compressor is controlled in the normal control.

If it is determined in step S440 that the IG 38 is not OFF, the history flag is set to 1 in step S460, and the compressor 25 is set to the forceful operation mode in step S470, as in the first embodiment. Here, if the result of the determination in step S430 is YES, that is, when the compressor state transition value F2(Tam) is 1 in the first cycle of the pollen mode control, the history flag is likewise set to 1 in step S460.

Accordingly, in the second embodiment, once the forceful operation of the compressor is effected in the pollen mode control in the temperature region where the ambient temperature Tam is lower than the second threshold (S400→S410→S430→S460→S470), then even when the pollen mode control is cleared or when the ambient temperature Tam becomes higher than the second threshold, the forceful operation mode of the compressor will not be cleared (S400→S440→S460→S470) until the IG 38 is turned off.

That is, even when the pollen mode control is cleared or when the ambient temperature rises, the compressor does not stop but continues to operate; therefore, condensed moisture adhering to the evaporator 13 during the forced operation of the compressor 25 is prevented from scattering off due to the temperature rise of the evaporator 13, and the dehumidified air continues to be supplied to the passenger compartment, preventing the occurrence of windshield fogging.

Embodiment 3

Next, a third embodiment of the present invention will be described. The third embodiment is the same as the second embodiment in that the compressor forceful operation mode is maintained even when the pollen mode control is cleared or when the ambient temperature Tam rises, but differs from the second embodiment in that the compressor forced operation mode is maintained until after a prescribed length of time elapses after the IG 38 has been turned off. In the following, the description of the same constituent parts as those in the second embodiment will not be repeated, but only differences will be described.

FIG. 9 is a flowchart showing a processing routine for judging the compressor control according to the third embodiment. As in the first and second embodiments, the blower level setting is executed in step S190 in the main routine of FIG. 2. In FIG. 9, the same processing steps as those in the first embodiment (FIG. 6) and the second embodiment (FIG. 8) are designated by the same step numbers, and the description thereof will not be repeated here.

That is, in the third embodiment, it is determined in step S442 whether a predetermined length of time (one hour) has elapsed after the turning off of the IG 38; after the IG 38 has been turned OFF, the history flag is held at 1 (S460) and the forced operating condition of the compressor 25 is maintained (S470) until after one hour elapses.

The forceful operating condition of the compressor in this step S470 means the condition in which, when the IG 38 is ON, the compressor 25 is actually operating and supplying the refrigerant to the evaporator 13 but, when the IG 38 is turned off, the actual operation of the compressor 25 is stopped but the compressor 25 is put in a condition ready to start operation immediately when the IG 38 is turned on next time.

If it is determined in step S442 that one hour has elapsed after the turning off of the IG 38, the history flag of the compressor forced operation mode is reset to 0 in step S450, as in the second embodiment, and the control returns to the normal control in step S420, that is, the air-conditioner is completely stopped.

As described above, in the third embodiment, even when the IG 38 is turned off, the forced operation mode of the compressor 25 is maintained until after the predetermined length of time (for example, one hour) elapses; therefore, if the IG 38 is turned on again within the predetermined length of time, the compressor 25 can immediately start operation and supply the refrigerant to the evaporator 13. Accordingly, within the one-hour period during which the OFF state of the IG 38 continues, any condensed moisture remaining adhering to the evaporator 13 can be prevented from scattering off the evaporator 13 because the cooling operation is immediately started when the IG 38 is turned on again, and thus, the occurrence of windshield fogging can be prevented.

Other Embodiments

The first embodiment has shown an example in which the process for forcibly setting the air inlet mode to the inside-air introduction mode in the pollen mode control when the ambient temperature Tam is higher than the first threshold is used in combination with the process for forcibly operating the compressor when the ambient temperature Tam is lower than the second threshold; however, the two processes need not necessarily be used in combination, but each process may be used singly. That is, when performing the process for forcibly setting the inside-air introduction mode, the compressor may be controlled based on the target evaporator outlet air temperature TEO used in the normal control. Conversely, when performing the process for forcibly operating the compressor, the air inlet mode may be set based on the target air outlet temperature TAO used in the normal control.

What is claimed is:

1. An automotive air-conditioning system comprising:
   an inside/outside air selecting means provided at an upstream end of an air-conditioning unit for selecting between inside air and outside air for introduction therein;
   a blower provided downstream of said inside/outside air selecting means, for blowing air into a vehicle passenger compartment;
   an evaporator provided downstream of said blower, for cooling the air supplied from said blower by a refrigerant which is pressurized and pumped out by a compressor;
   pollen mode setting means for setting a pollen mode control;
   an ambient temperature sensor for detecting an ambient temperature outside said passenger compartment; and
   an air-conditioner control unit having control switching means switching operation of at least either said inside/outside air selecting means or said compressor from a normal control to a forced control in accordance with the ambient temperature detected by said ambient temperature sensor when said pollen mode control is set;
   wherein
   when said pollen mode control is set, said control switching means in said air-conditioner control unit sets said inside/outside air selecting means to an inside-air introduction mode when said ambient temperature is higher than a first threshold in a low-temperature region, and sets said inside/outside air selecting means to a normal control when said ambient temperature drops below said first threshold; and
   said compressor includes compressor condition judging means for judging whether said compressor is able to operate normally, and wherein when said ambient temperature is higher than said first threshold, and when a negative response is returned as a result of said judgment by said compressor condition judging means, said control switching means in said air-conditioner control unit sets said inside/outside air selecting means to said normal control in said pollen mode control.

2. An automotive air-conditioning system as claimed in claim 1, wherein said pollen mode setting means comprises a pollen mode switch or a pollen sensor, and when said pollen mode switch is operated or when the amount of pollen detected by said pollen sensor exceeds a predetermined value, it is determined that said pollen mode control is set.

3. An automotive air-conditioning system as claimed in claim 1, wherein when said pollen mode control is set, said control switching means in said air-conditioner control unit operates said compressor to cool said evaporator.

4. An automotive air-conditioning system as claimed in claim 3, wherein when said pollen mode control is set, said control switching means in said air-conditioner control unit operates said compressor to cool said evaporator when said ambient temperature is lower than a second threshold.

5. An automotive air-conditioning system as claimed in claim 3, wherein said control switching means in said air-conditioner control unit continues to operate said compressor after the setting of said pollen mode control is cleared by said pollen mode setting means.

6. An automotive air-conditioning system as claimed in claim 5, wherein said control switching means in said air-conditioner control unit stops the operation of said compressor when an ignition switch is turned off.

7. An automotive air-conditioning system as claimed in claim 5, wherein said control switching means in said air-conditioner control unit stops the operation of said compressor in accordance with a length of time that has elapsed after an ignition switch has been turned off.

* * * * *